United States Patent [19]
Chin-Fu

[11] Patent Number: 5,826,307
[45] Date of Patent: Oct. 27, 1998

[54] ROTATING SPINDLE MECHANISM

[76] Inventor: Horng Chin-Fu, 5F, No. 2, Alley 6, Lane 36, Tsu-Hsiu Rd., Tai Shan, Taipei Hsien, Taiwan

[21] Appl. No.: 877,176

[22] Filed: Jun. 17, 1997

[51] Int. Cl.$^6$ .................................................. E05C 17/64
[52] U.S. Cl. .............................................. 16/340; 16/386
[58] Field of Search ............................ 16/340, 337, 338, 16/342, 386; 403/153, 154, 156, 150; 411/41, 333, 334, 335

[56] References Cited

U.S. PATENT DOCUMENTS

| | | | |
|---|---|---|---|
| 658,621 | 9/1900 | Dalzell | 403/154 |
| 4,411,570 | 10/1983 | Juric | 411/333 |
| 4,607,977 | 8/1986 | Varnelis et al. | 403/154 |
| 4,951,349 | 8/1990 | Dietrich et al. | 16/228 |
| 5,008,976 | 4/1991 | Busch | 16/276 |
| 5,619,810 | 4/1997 | Kasim | 403/154 |

*Primary Examiner*—Chuck Y. Mah
*Attorney, Agent, or Firm*—Rosenberg, Klein & Bilker

[57] ABSTRACT

The subject invention relates to a rotating spindle mechanism comprising a first fixed plate, a second fixed plate, a first washer, a second washer, a screw and a sleeve; said screw penetrating the first washer, the spindle hole on the second fixed plate and the second washer, then tightened into the inside thread of the sleeve, while the other end of the screw being riveted to the sleeve, the spindle part of the screw being enclosed by the first washer, the spindle hole on the second fixed plate and the second washer, the rivet blocks of the sleeve being riveted onto the rivet hole on the first fixed plate, to comprise the rotating spindle mechanism; With said construction, it will achieve such advantages and effects as better tightness, easier adjustment, free from oil stains, higher rate of satisfactory parts, extended service life of rotating spindle, secure fixation without loosening, reduced cubic measurements, better employment of space, reduced production costs, better configuration without deformation, etc.

6 Claims, 5 Drawing Sheets

ROTATING SPINDLE MECHANISM

DESCRIPTION OF THE INVENTION

The subject invention relates to a rotating spindle mechanism, particularly to one applicable to notebook computers and such appliances.

Conventionally, there is a rotating spindle that combines the main unit of a notebook computer with its LCD monitor to become one compact device wherein the rotating spindle acts as the fulcrum and the LCD monitor can be opened up from or closed down onto the main unit.

Referring to FIG. 1 which is a plain view of a prior art of rotating spindle, said conventional rotating spindle comprising two fixed plates 10a and 11a respectively fixed onto the main unit 12a and the LCD monitor 13a, on one end of the fixed plate is a spindle 14a, the other end of the spindle is a riveted washer 15a. Meanwhile, on two sides of the spindle body 14a on the fixed plate 11a are respectively a copper strip 16a and several arc washers 17a and washers 18a, and with the friction between the copper strip 16a, the washers 17a and 18a, and the fixed plate 11a, the two fixed plates 10a and 11a will be able to rotate properly, and with some flexibility given by the arc washer 17a to avoid jamming.

In said conventional rotating spindle, however, the copper strip 16a and the washers 17a and 18a, being made of metal, need regular lubrication which would cause oil stains and higher rate of defective parts. Besides, in case of powerful riveting force in the process of riveting the washer 15a onto one end of the spindle 14a, the spindle 14a would be deformed. Furthermore, the metal washer 17a, with its arc shape to form a clearance to enable adjustment of the spindle 14a, will be loosened due to repeated friction after extensive period of use. Therefore, it is obvious that the aforesaid conventional rotating spindle mechanism does involve inconvenience and disadvantages, in terms of practical usage, that need improvement.

In view of the above, the subject inventor has devoted much time and effort in the research, with the employment of theoretical principles, and designing of the subject invention that will reasonably and effectively remedy the above disadvantages.

The major objective of the subject invention is to provide a type of rotating spindle mechanism, comprising a first fixed plate, a second fixed plate, a first washer, a second washer, a screw and a sleeve, etc. whereby friction occurs from the contact of mild steel materials of the first washer, the second washer, the second fixed plate, the screw and the sleeve to enable better tightness, easy adjustment, no oil stain, higher rate of satisfactory parts, extended service life of rotating spindle, better binding effect of the sleeve which is screw tightened before it is riveted, and reduced cubic measurements because of shortened length of the spindle than conventional ones, so the costs are reduced and no deformation will result due to riveting process.

The designing methods and performance of the subject invention to achieve the above objective and structure are described below with drawings of embodiment:

Description of Numerals

| | | | |
|---|---|---|---|
| 10 | the first fixed plate | 11 | the second fixed plate |
| 12 | the first washer | 13 | the second washer |
| 14 | screw | 15 | sleeve |
| 16 | spindle hole | 17 | rivet hole |
| 18 | spindle hole | 19 | spindle |
| 20 | rivet block | 21 | rivet end |
| 22 | inside thread | 23 | PC main unit |
| 24 | LCD monitor | 25 | accommodating groove |
| 26 | accommodating groove | | |
| 10a | fixed plate | 11a | fixed plate |
| 12a | PC main unit | 13a | LCD monitor |
| 14a | spindle body | 15a | washer |
| 16a | copper strip | 17a | washer |
| 18a | washer | | |

Figure 1:
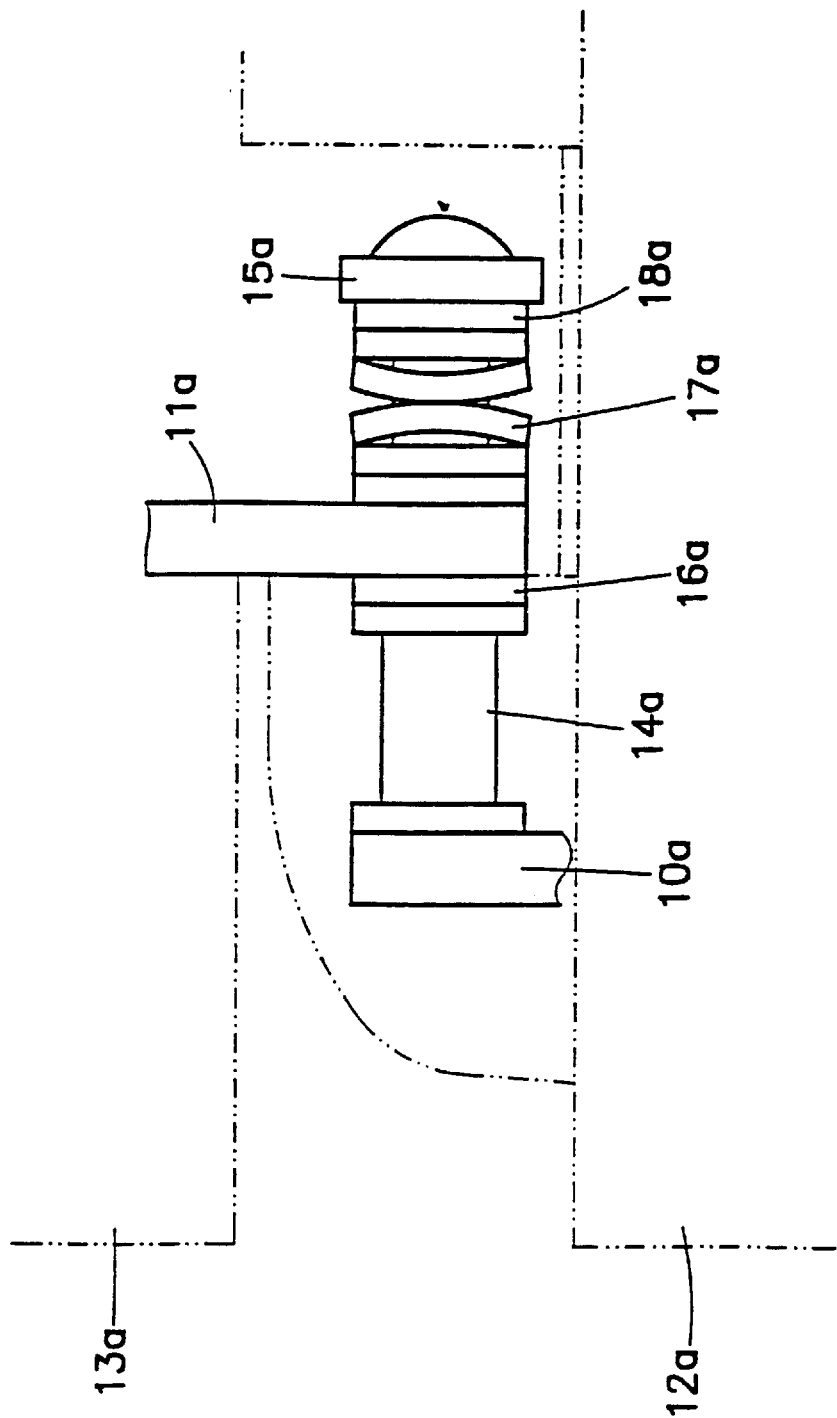
FIG. 1 is the plain view of conventional rotating spindle. (Prior Art)
Figure 2:
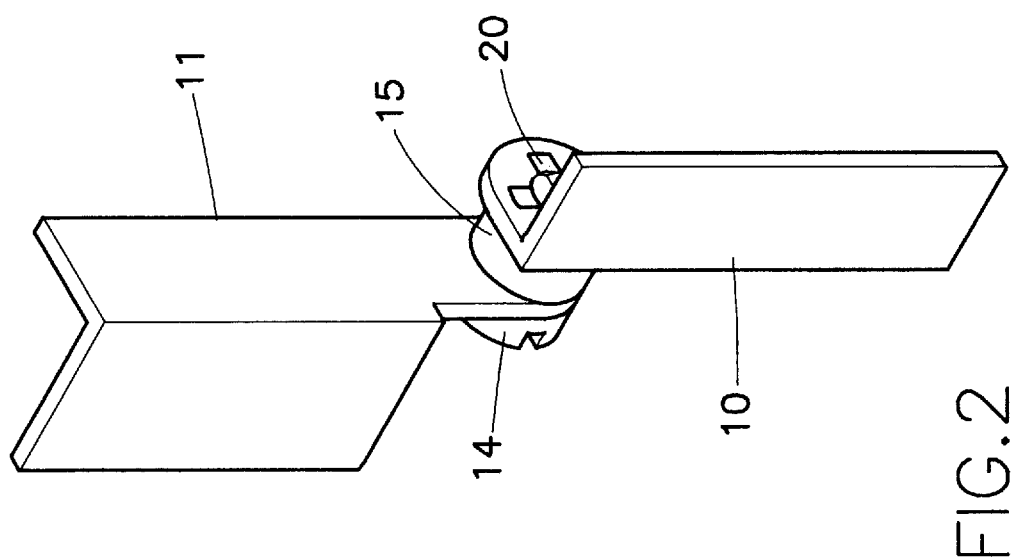
FIG. 2 is the perspective view of the subject invention.
Figure 3:
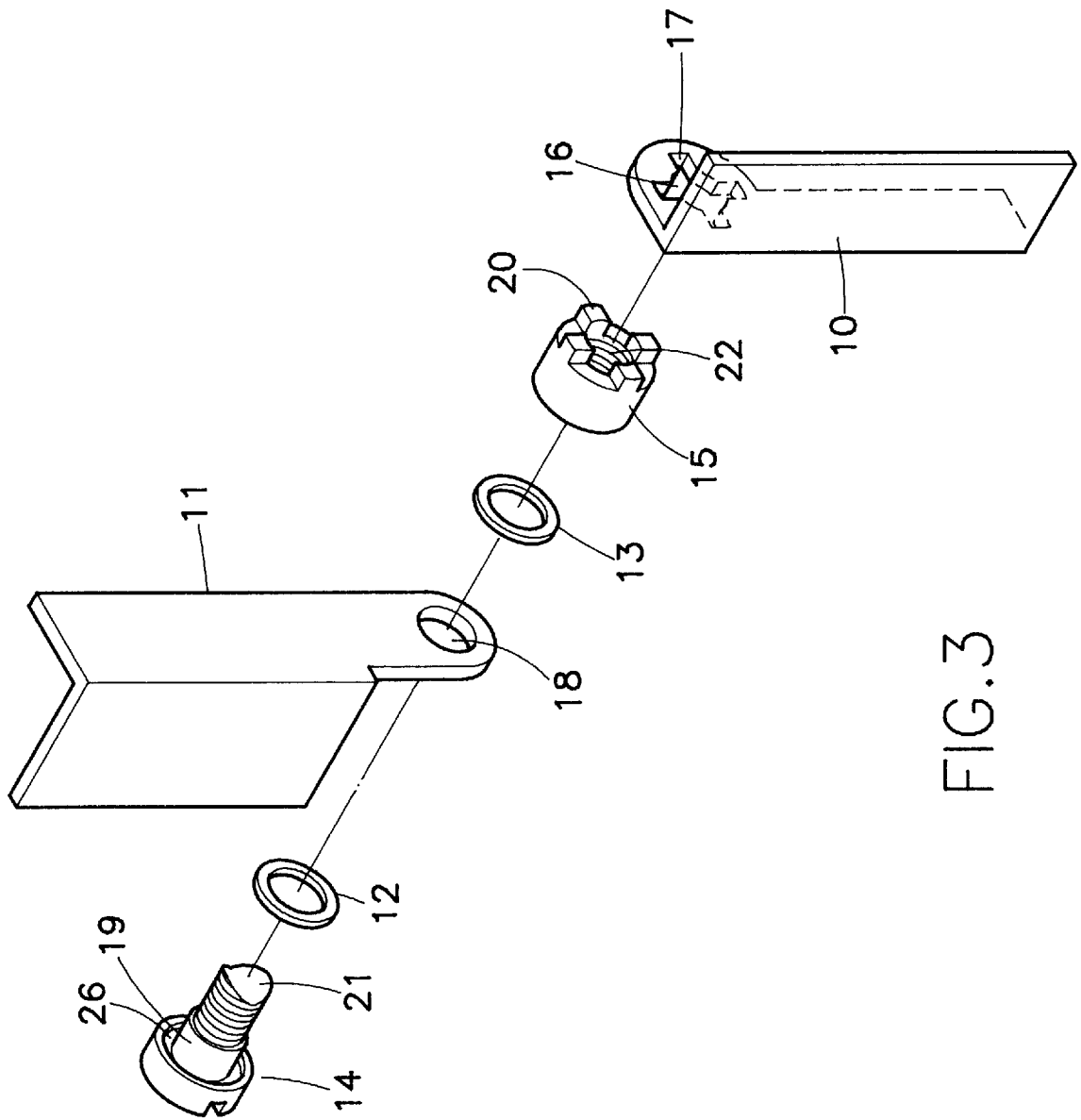
FIG. 3 is the exploded view of the subject invention.
Figure 4:
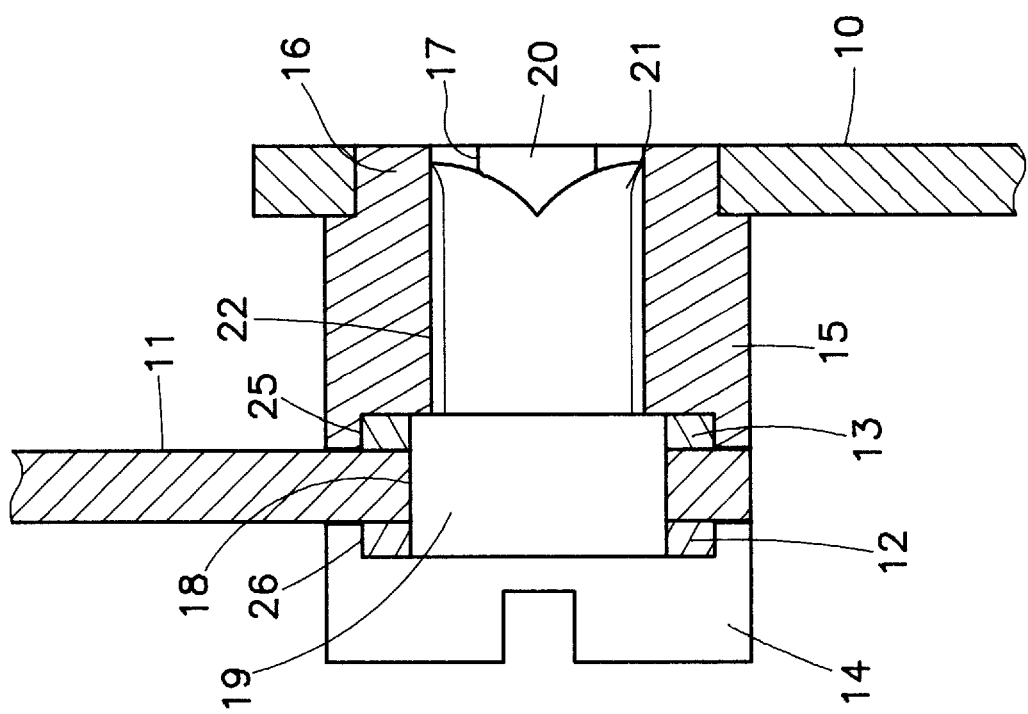
FIG. 4 is the section view of the subject invention.

Referring to FIGS. 2, 3 and 4 which are respectively the perspective view, exploded view and section view of the subject invention which relates to a rotating spindle mechanism comprising a first fixed plate 10, a second fixed plate 11, a first washer 12, a second washer 13, a screw 14 and a sleeve 15, etc. wherein, the first fixed plate 10 is an L-shaped plate body, on one end of said first fixed plate 10 is a spindle hole 16, by the spindle hole 16 are several riveting holes 17. The second fixed plate 11 is also an L-shaped plate body, on one end of said fixed plate 11 is a spindle hole 18.

The first washer 12 and the second washer 13 are made of mild steel, said two washers 12 and 13 are positioned at two sides of the spindle hole 18 on the second fixed plate 11. The outer diameter of screw 14 involves a spindle part 19 of an appropriate length and diameter, the head of the screw 14 may have a recess of accommodating groove 26 to accommodate the first washer 12, the sleeve 15 is a hollow cylinder body with one end of several rivet blocks which are to be inserted in the corresponding rivet holes 17 on the first fixed plate 11, on the inside wall of the sleeve 15 is inside thread 22, the other end of the sleeve 15 may have a recess of accommodating groove 25 to accommodate the second washer 13.

The first step to assemble the subject invention is to penetrate, in sequential order, the screw 14, the first washer 12, the spindle hole 18 on the second fixed plate 11, the second washer 13, the inside thread 22 in the sleeve 15, then the end of the screw 14 is riveted at the other end of the sleeve 15, thus by means of the rivet end 21, the screw 14 will not be loosened out of the sleeve 15. Now, the spindle 19 of the screw 14 has penetrated the first washer 12, the spindle hole 18 on the second fixed plate 11 and the second washer 13, while the first washer 12 and the second washer 13 are respectively accommodated in the accommodating groove 26 and 25, and the rivet block 20 of the sleeve 15 has penetrated the rivet hole 17 on the first fixed plate 10, then the rivet block 20 and the rivet hole 17 are riveted as one, so that the sleeve 15 is fixed onto the first fixed plate 10 to comprise a complete rotating spindle mechanism.

Figure 5:
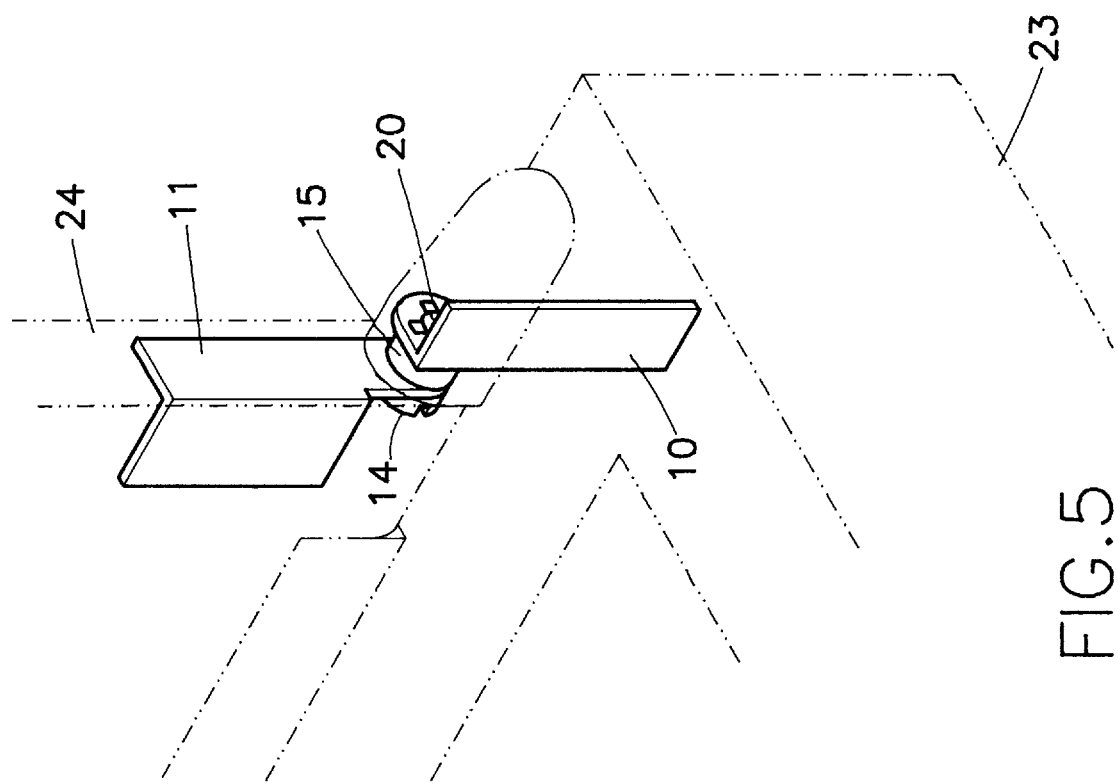
FIG. 5 is the perspective view of the subject invention when installed a notebook computer.

Referring to FIG. 5 which is a perspective view of the subject invention when installed on a notebook computer, the subject invention of rotating spindle can be fixed between the notebook computer's main unit 23 and the LCD monitor 24, wherein the first fixed plate 10 and the second fixed plate 11 are respectively fixed on the main unit 23 and the LCD monitor 24, so that the main unit 23 and the LCD monitor 24 are joined by the rotating spindle, and the LCD monitor 24 can be opened from or closed to the main unit 23 by rotating the spindle as its fulcrum.

Due to the contact and friction of the first washer 12, the second washer 13, the second fixed plate 11, the screw 14 and the sleeve 15, etc. which are made of mild steel material, there can be better tightness, easier adjustment, no oil stains and higher rate of satisfactory parts. The mild-steel-made washers 12 and 13 will have better resistance to torque and lengthened service life of the rotating spindle. The screw 14 and the sleeve 15 are screw tightened before the screw is riveted, so it will not be loosened. Furthermore, the length of the spindle of the subject invention may be made much shorter than a prior art, so its cubic measurements and production costs are reduced. And, it will not be deformed in the riveting process.

Summing up, the subject invention is indeed an improvement of conventional rotating spindles which involve metal friction, oil stains, higher rate of defective parts, deformed spindle due to powerful riveting force, easy loosening, and other problems. Therefore, with its innovativeness and advancement that will satisfy the requirements for a patent right, this application is filed in accordance with the patent law to protect the subject inventor's rights and interests. Your favorable consideration should be appreciated.

It is declared herewith that the above description of the preferred embodiment examples should not be based to limit or restrict the scope of claims of the subject invention, and that all variations with similar effects deriving from the subject description, drawing or contents herein should be reasonably included in the scope of claims of the subject invention.

I claim:

1. A rotating spindle mechanism comprising:
    a first fixed plate having a first spindle hole formed therethrough adjacent one end thereof, said first fixed plate having at least one rivet hole formed therethrough and extending from a perimeter edge of said first spindle hole;
    a second fixed plate having a second spindle hole formed therethrough adjacent one end thereof and disposed in aligned relationship with said first fixed plate;
    a screw having (a) a head end portion, (b) a spindle body portion extending from said head end portion and passing through said second spindle hole, and (c) a threaded portion extending from said spindle body portion;
    a pair of washers disposed on said spindle body portion on opposing sides of said second fixing plate; and,
    a sleeve having at least one rivet block formed on a first longitudinal end thereof and received in said at least one rivet hole of said first fixed plate and riveted thereto, said sleeve having an internally threaded bore extending longitudinally therethrough for threaded engagement with said threaded portion of said screw, said screw having a distal end of said threaded portion riveted to said sleeve, wherein said second spindle plate is rotatively displaceable on said spindle body portion of said screw.

2. The rotating spindle mechanism as recited in claim 1 where said first fixed plate has a plurality of rivet holes extending from a perimeter edge of said first spindle hole in angularly spaced relationship one with respect to another, said sleeve having a plurality of rivet blocks respectively received in said plurality of rivet holes and riveted thereto.

3. The rotating spindle mechanism as recited in claim 1 where said first fixed plate has a plate body with an L-shaped contour.

4. The rotating spindle mechanism as recited in claim 1 where said second fixed plate has a plate body with an L-shaped contour.

5. The rotating spindle mechanism as recited in claim 1 where said first fixed plate is adapted to be coupled to a computer main unit and said second fixed plate is adapted to be coupled to an LCD monitor for rotative displacement of said LCD monitor relative to said computer main unit.

6. The rotating spindle mechanism as recited in claim 1 where said head end portion of said screw has a first annular groove formed therein for receiving a first of said pair of washers in said first annular groove, said sleeve having a second longitudinal end with a second annular groove formed therein for receiving a second of said pair of washers in said second annular groove.

* * * * *